(12) United States Patent
Osorio

(10) Patent No.: US 9,222,415 B2
(45) Date of Patent: Dec. 29, 2015

(54) GAS TURBINE ENGINE FUEL HEATING SYSTEM

(75) Inventor: Omar I. Osorio, San Diego, CA (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 910 days.

(21) Appl. No.: 13/413,419

(22) Filed: Mar. 6, 2012

(65) Prior Publication Data

US 2013/0232989 A1    Sep. 12, 2013

(51) Int. Cl.
*F02C 7/224* (2006.01)
*F02C 9/28* (2006.01)

(52) U.S. Cl.
CPC . *F02C 7/224* (2013.01); *F02C 9/28* (2013.01); F05D 2270/303 (2013.01)

(58) Field of Classification Search
CPC ............... F02C 1/04; F02C 1/05; F02C 1/06; F02C 6/06; F02C 6/08; F02C 6/04; F02C 7/08; F02C 7/14; F02C 7/18; F02C 7/224; F02C 9/28; F05D 2260/213; F05D 2270/303; F05D 2260/3032
See application file for complete search history.

(56) References Cited

U.S. PATENT DOCUMENTS

| | | | |
|---|---|---|---|
| 4,696,156 A * | 9/1987 | Burr et al. ................. | 60/39.08 |
| 4,932,204 A | 6/1990 | Pavel et al. | |
| 5,124,052 A | 6/1992 | Hardaker | |
| 6,253,554 B1 * | 7/2001 | Kobayashi et al. ........ | 60/736 |
| 6,651,441 B2 | 11/2003 | Reuter et al. | |
| 7,337,605 B2 | 3/2008 | Hagshenas | |
| 7,565,792 B2 * | 7/2009 | Tanaka et al. ............ | 60/39.281 |
| 2004/0134194 A1 | 7/2004 | Roby et al. | |
| 2007/0089423 A1 * | 4/2007 | Norman et al. .............. | 60/772 |
| 2007/0095068 A1 | 5/2007 | Joshi et al. | |
| 2008/0314573 A1 * | 12/2008 | Schwarz et al. ............ | 165/166 |
| 2009/0302152 A1 * | 12/2009 | Knight ........................ | 244/58 |
| 2010/0024429 A1 | 2/2010 | Zhang et al. | |
| 2010/0131169 A1 * | 5/2010 | DiAntonio et al. ........ | 701/100 |
| 2010/0307158 A1 * | 12/2010 | Bilton et al. ............... | 60/736 |
| 2011/0297357 A1 | 12/2011 | Myers et al. | |

FOREIGN PATENT DOCUMENTS

| | | |
|---|---|---|
| JP | 56-002058 U | 1/1981 |
| JP | 08-165926 A | 6/1996 |
| JP | 2003-041946 A | 2/2003 |

OTHER PUBLICATIONS

International Search Report and Written Opinion, mailed Jun. 2, 2013.
European Patent Office, the extended European search report, Oct. 20, 2015, 6 pages.

* cited by examiner

*Primary Examiner* — Andrew Nguyen
(74) *Attorney, Agent, or Firm* — Kinney & Lange, P.A.

(57) ABSTRACT

A fuel heating system for a gas turbine engine comprises a first heat exchanger, a second heat exchanger, a fuel pump and a valve. The first heat exchanger produces a heated air flow. The second heat exchanger receives the heated air flow from the first heat exchanger. The fuel pump provides a fuel flow. The valve is coupled to the fuel pump to intermittently include the second heat exchanger in the fuel flow based on a temperature of the fuel flow. A method of heating fuel in a gas turbine engine comprises providing fuel to a gas turbine engine with a fuel pump to sustain a combustion process, heating a flow of air with exhaust gas from the combustion process, and heating fuel from the fuel pump en route to the gas turbine engine with the flow of air based on a temperature of the fuel.

17 Claims, 1 Drawing Sheet

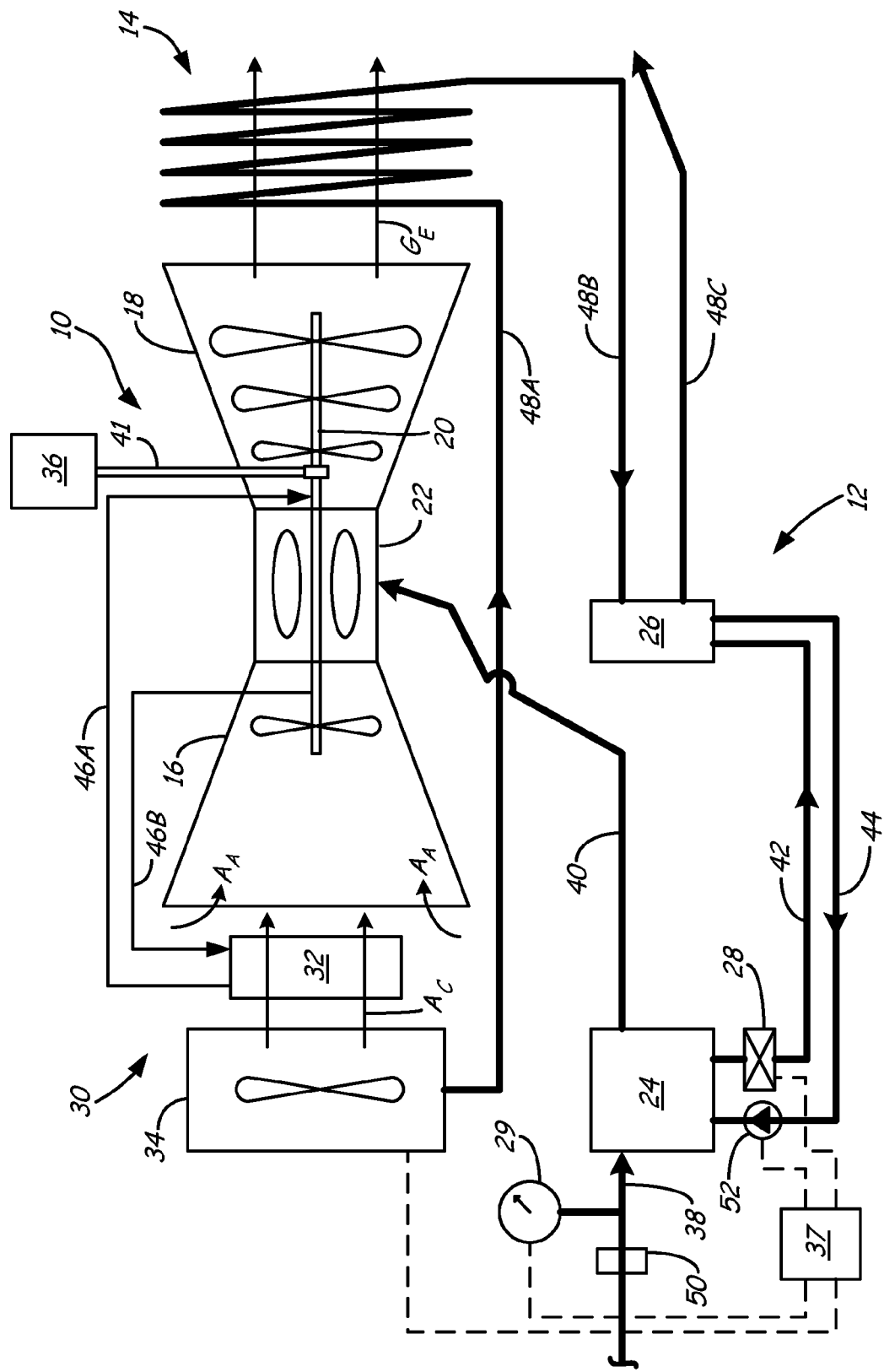

GAS TURBINE ENGINE FUEL HEATING SYSTEM

BACKGROUND

The present invention is directed generally to fluid control systems for gas turbine engines and more particularly to fuel heating systems.

Gas turbine engines operate during varied environmental conditions, including at temperatures below the freezing point of water. Additionally, it is possible for the fuel to absorb water under various conditions. Ice crystals therefore have a tendency to form in the fuel under certain conditions, particularly at high altitudes or before the engine is operating. The ice crystals can plug fuel lines and orifices in the fuel system, which may degrade performance of the gas turbine engine or even cause an engine stall. As such, gas turbine engines are equipped with systems for eliminating or removing ice particles from fuel lines. For example, last-chance screens are often provided just before the fuel pump to remove any ice crystals. The screens, however, must be periodically cleared to prevent blockage of fuel flow. It is, therefore, more desirable to eliminate ice crystals from the fuel system altogether. Typical ice removal systems comprise a heat exchanger that imparts heat to the fuel from engine oil used to cool bearings in the engine. However, such systems require time for the engine oil to heat up, thereby delaying the melting of any ice crystals. Further, at high altitude conditions the heat exchanger may not be able to extradite adequate heat from the engine oil to melt the ice. There is, therefore, a need for improved fuel heating systems.

SUMMARY

The present invention is directed to a fuel heating system for a gas turbine engine. The fuel heating system comprises a first heat exchanger, a second heat exchanger, a fuel pump and a valve. The first heat exchanger produces a heated air flow. The second heat exchanger receives the heated air flow from the first heat exchanger. The fuel pump provides a fuel flow to the second heat exchanger. The valve is coupled to the fuel pump to intermittently include the second heat exchanger in the fuel flow based on a temperature of the fuel flow. In another embodiment, a gas turbine engine has a combustor that receives the fuel flow and that produces exhaust gas in thermal communication with the first heat exchanger, and the valve is configured to bring the second heat exchanger into the fuel flow between the fuel pump and the combustor.

The present invention is also directed to a method of heating fuel in a gas turbine engine. The method comprises providing fuel to a gas turbine engine with a fuel pump to sustain a combustion process, heating a flow of air with exhaust gas from the combustion process, and selectively heating fuel from the fuel pump en route to the gas turbine engine with the flow of air based on a temperature of the fuel. In another embodiment, the method comprises passing the flow of air through a coil disposed in the exhaust gas, and then passing the flow of air through a heat exchanger in thermal communication with the fuel. In yet another embodiment, the method comprises sensing a temperature of the fuel before entering the fuel pump, and modulating flow of fuel to the heat exchanger using a valve responsive to a sensed temperature of the fuel.

BRIEF DESCRIPTION OF THE DRAWINGS

The sole FIGURE shows a schematic of a gas turbine engine having a fuel heating system of the present invention.

DETAILED DESCRIPTION

The sole FIGURE shows a schematic of gas turbine engine 10 having fuel heating system 12 including fuel heater 14 of the present invention. Gas turbine engine 10 includes compressor 16, turbine 18, shaft 20 and combustor 22. Fuel heating system 12 further includes fuel pump 24, heat exchanger 26, heater valve 28 and temperature sensor 29. Gas turbine engine 10 is also interconnected with lubrication system 30, which includes oil cooler 32 and fan 34. In the embodiment discussed, gas turbine engine 10 comprises an auxiliary power unit (APU) configured to drive electrical generator 36. Gas turbine engine 10 and heater 14 of the present invention may, however be implemented in other types of gas turbine engine, such as those used for propulsive force in aircraft and those used in the industrial gas turbine field. Combustor 22, fan 34, valve 28 and fuel pump 24 are in electronic communication with engine controller 37.

Gas turbine engine 10 operates in a conventional manner by combusting fuel from fuel pump 24 and compressed air from compressor 16 in combustor 22 to produce high energy gases for driving turbine 18. Fuel pump 24 includes inlet line 38, which receives fuel from a fuel tank (not shown), and outlet line 40, which delivers fuel to combustor 22. Outlet line 40 may include other components, such as a metering valve, connected to controller 37 to precisely regulate fuel flow to combustor 22. Engine controller 37 determines the rate of fuel flow to combustor 22 based on the demands placed on engine 10, as is known in the art. For example, engine controller 37 may comprise a Full Authority Digital Engine Controller (FADEC). Compressor 16 draws in ambient air $A_A$, compresses it and provides it to combustor 22. Combustor 16 includes conventional fuel injectors and igniters for burning a mixture of fuel and air to provide exhaust gas $G_E$ that turns turbine 18. Rotation of turbine 18 drives shaft 20, which rotates compressor 16 and electrical generator 36. Electrical generator 36 is shown schematically being driven by tower shaft 41, which is coupled to shaft 20 through a gearbox, as is known in the art. Fuel pump 24 also includes bypass line 42 and return line 44, which are regulated by valve 28. Valve 28 controls flow of fuel to heat exchanger 26 to melt ice before entering fuel line 40 where clogging of orifices within the fuel metering valve or the combustor may occur.

Aside from exhaust gas $G_E$, operation of gas turbine engine 10 produces heat, particularly in bearings used to support shaft 20. As such, lubrication system 30 provides a continuously circulated flow of oil between the bearings, oil sumps and an oil tank by an oil pump (not shown) coupled to oil lines 46A and 46B. Oil cooler 32 is coupled into oil lines 46A and 46B, such as to be provided with heated oil from the oil sumps and to provide cooled oil to the oil pump. In the embodiment discussed, oil cooler 32 comprises an air cooled heat exchanger that receives cooling air $A_C$ from fan 34. Engine controller 37 is in communication with sensors (not shown) that determine the temperature of the oil and can adjust the speed of fan 34 to provide increased or decreased cooling to oil cooler 32. Oil cooler 32 and fan 34 are shown positioned upstream of compressor 16, but need not be in other configurations.

Fan 34 includes mechanically rotated fan blades to push a flow of cooling air $A_C$ across cooling fins in oil cooler 32. Fan 34 can be mechanically driven by shaft 20, a gear train coupled to shaft 20, or an electric motor powered by electrical generator 36 or some other such electrical power supply. Fan 34 is fluidly connected to heat exchanger 26 through air line 48A, heater 14 and air line 48B. In the embodiment shown, the fluid comprises compressed air that is siphoned from fan 34 and provided to heat exchanger 26. The compressed air from fan 34 is sufficiently pressurized by the fan blades to produce flow through air line 48A, heater 14, air line 48B, heat exchanger 26 and air line 48C. For example, the speed of fan 34 and the resulting pressure of the air can be increased by engine controller 37 as needed. Compressed air from heat exchanger 26 is expelled from fuel heating system 12 through air line 48C. In other embodiments, a dedicated coolant can be continuously cycled between heater 14 and heat exchanger 26 via a pump.

Heat exchanger 26 receives a motive flow of a heated fluid from heater 14 and a motive flow of cold fuel from pump 24. In one embodiment, heat exchanger 26 comprises a dual-fluid plate-fin heat exchanger. After passing through heat exchanger 26, the cooled motive fluid is dumped from system 12. Cold fuel from fuel pump 24 enters heat exchanger 26 through bypass line 42 and the heated fuel is restored to fuel pump 24 through return line 44. Valve 28 is responsive to input from temperature sensor 29 to periodically connect heat exchanger 26 in series between pump 24 and combustor 22 based on temperatures sensed by sensor 29.

Engine controller 37 is in electronic communication with sensor 29 and fuel pump 24 to modulate circulation of fuel through heat exchanger 26, depending on atmospheric conditions such as temperature and barometric pressure. Fuel pump 24 is configured to provide motive flow of fuel to combustor 22 under default operating conditions. Under adverse atmospheric conditions, valve 28 is actuated by engine controller 37 to circulate fuel through heat exchanger 26 before allowing the fuel to continue to combustor 22.

Temperature sensor 29 is in thermal communication with fuel in line 38. When temperature sensor 29 detects temperatures above a threshold level, a signal is sent to engine controller 37 to maintain valve 28 in a closed state. With valve 28 closed, fuel is permitted to flow uninterruptedly from the fuel tank, through inlet line 38, pump 24 and outlet line 40, while fuel is prevented from entering line 42. Check valve 52 prevents backflow of fuel into line 44. The threshold level may be the freezing point of water (0° C. or 32° F.), some threshold temperature above the freezing point of water to provide a safety factor, or a temperature above the freezing point of water at which the water may freeze due to elevated altitude, which can be sensed by engine controller 37. Default operation is desirable and acceptable, and indicates that the presence of ice in the fuel lines is absent and not possible.

Temperatures at or below the threshold level produce conditions at which ice crystals may form in fuel lines 38 and 40, fuel pump 24, the fuel metering valve or injectors within combustor 22, which may adversely impact the operation of engine 10. Fuel lines 38 and 40 are provided with screens to filter the crystals from the system. For example, screen 50 is positioned upstream of fuel pump 24 to remove ice crystals from fuel heating system 12. The screens can further be provided with means for removing or melting the crystals in the screen to prevent blockage of fuel flow, as is known in the art. However, it is desirable to altogether prevent the formation of the crystals to avoid the need for their removal and disposal. For example, at start-up of engine 10 ice crystals may have formed in fuel already present in line 40 that cannot be caught by filter 50. Thus, temperatures that are at or below the threshold indicate to engine controller 37 a need to heat the fuel. When engine controller 37 detects a temperature from temperature sensor 29 at or below the threshold level, a signal is sent to open valve 28.

Temperature sensor 29 is positioned upstream of fuel pump 24 so that engine control 37 can act to prevent ice crystals from reaching combustor 22 where injectors having fine orifices are located. Using lines 42 and 44, valve 28 routes fuel to heat exchanger 26 to melt ice crystals and prevent blocking of the injector orifices before permitting the fuel to continue on to combustor 22. Heater 14 is positioned so as to be in thermal communication with exhaust gas $G_E$ so that the compressed air from fan 34 is heated. Heater 14 can be placed directly in the flow of exhaust gas $G_E$ or adjacent the flow of exhaust gas $G_E$.

Heater 14 comprises a heat exchanger that transfers heat from exhaust gas $G_E$ to compressed air from fan 34. As such, heater 14 may comprise a dual-fluid plate-fin heat exchanger that is coupled to tubing comprising lines 48A and 48B. In the embodiment shown, heater 14 comprises a tube that is coiled in a helical fashion and disposed within the outer diametrical limits of the flow of exhaust gas $G_E$. Thus, heater 14 has approximately the same diameter as the downstream exit of turbine 18. In other embodiments, heater 14 may comprise a tube coiled in a serpentine fashion so as to shape a planar body that can be placed perpendicular to the flow of exhaust gas $G_E$. Coiled embodiments of heater 14 may also include heat transfer-enhancing features such as fins in other embodiments. In another embodiment, heat exchanger 26 can be omitted and heater 14 comprises a tube wrapped directly around a fuel line connecting lines 42 and 44.

Heat from exhaust gas $G_E$ increases the temperature of the compressed air within heater 14 to temperatures sufficiently high so as to be able to increase the temperature of the fuel within heat exchanger 26 to melt ice crystals within the fuel and to prevent reforming of ice crystals within lines 44 and 40. Engine controller 37 can increase the speed of fan 34 to increase the flow of compressed air to heater 14, thereby increasing the heating of the fuel, based on temperatures detected by sensor 29. Thus, the risk of ice crystals clogging fuel line 40 and small orifices within fuel pump 24 and combustor 22 is eliminated, thereby increasing the operating efficiency and safety of gas turbine engine 10. Heat from exhaust gas $G_E$ is immediately available at the start-up of engine 10. For example, as soon as engine 10 is operating, combustion is occurring within combustor 22 at temperatures exceeding 1000° F. (538° C.), sufficient enough to heat the fuel and melt any ice crystals within moments of ignition. Thus, any wait time needed for the heating of the fuel is eliminated, as was required in prior art fuel heating systems using heat generated by sustained circulation of the engine oil.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A gas turbine engine fuel system comprising:
a fuel pump for providing a fuel flow;
a gas turbine engine comprising:
a compressor for compressing inlet air;
a combustor for mixing the fuel flow with compressed inlet air and producing exhaust gas; and
a turbine for receiving exhaust gas from the combustor;
a coil disposed within exhaust gas leaving the turbine so as to be heated, the coil configured to receive a motive flow of fluid; and a heat exchanger in fluid communication with the motive flow of fluid from the coil and the fuel flow from the fuel pump so as to transfer heat from the motive flow of fluid to the fuel flow;

wherein the fuel pump comprises:

an inlet line for receiving fuel, the inlet line including a temperature sensor;

an outlet line in fluid communication with the combustor;

a bypass line in fluid communication with the heat exchanger, the bypass line including a bypass valve; and a return line in fluid communication with the heat exchanger, the return line including a check valve.

2. The gas turbine engine fuel system of claim 1 wherein the motive flow of fluid comprises air generated by a fan.

3. The gas turbine engine fuel system of claim 2 and further comprising:

an oil cooler configured to receive air from the fan and oil from a lubrication system connected to the gas turbine engine.

4. The gas turbine engine fuel system of claim 2 wherein the motive flow of fluid from the heat exchanger is discharged from the gas turbine engine fuel system.

5. The gas turbine engine fuel system of claim 1, wherein the temperature sensor measures a sensed temperature of the fuel flow entering the fuel pump.

6. The gas turbine engine fuel system of claim 5 and further comprising: the bypass valve responsive to the sensed temperature of the fuel flow, the bypass valve being configured to route the fuel flow from the fuel pump to the heat exchanger when the sensed temperature drops below a threshold temperature level.

7. The gas turbine engine fuel system of claim 6 wherein the heat exchanger is configured to route the fuel flow back to the fuel pump for delivery to the combustor.

8. The gas turbine engine fuel system of claim 1 wherein the gas turbine engine comprises an auxiliary power unit.

9. A method of heating fuel in a gas turbine engine, the method comprising:

providing fuel to the gas turbine engine with a fuel pump to sustain a combustion process;

heating a flow of air with exhaust gas from the combustion process by passing the flow of air through a coil disposed in the exhaust gas;

selectively heating fuel from the fuel pump en route to the gas turbine engine with the flow of air based on a sensed temperature of the fuel before the fuel enters the fuel pump, wherein the fuel is heated by passing the air flow through a heat exchanger in thermal communication with the fuel; and modulating flow of fuel to the heat exchanger using a bypass valve responsive to the sensed temperature of the fuel, the bypass valve being configured to route the fuel flow from the fuel pump to the heat exchanger when the sensed temperature drops below a threshold temperature level.

10. The method of claim 9 and further comprising generating the flow of air utilizing a fan.

11. The method of claim 9 and further comprising routing the fuel from the heat exchanger to the fuel pump for delivery to a combustor of the gas turbine engine.

12. The method of claim 9, wherein the fuel pump comprises:

an inlet line for receiving fuel, the inlet line including a temperature sensor;

an outlet line in fluid communication with the combustor;

a bypass line in fluid communication with the heat exchanger, the bypass line including the bypass valve; and a return line in fluid communication with the heat exchanger, the return line including a check valve, wherein said modulating flow of fuel comprises adjusting the bypass valve.

13. A gas turbine engine fuel system comprising:

a fuel pump for providing a fuel flow;

a gas turbine engine comprising:

a compressor for compressing inlet air;

a combustor for mixing the fuel flow with compressed inlet air and producing exhaust gas; and a turbine for receiving exhaust gas from the combustor;

a coil disposed within exhaust gas leaving the turbine so as to be heated, the coil configured to receive a motive flow of fluid;

a heat exchanger in fluid communication with the motive flow of fluid from the coil and the fuel flow from the fuel pump so as to transfer heat from the motive flow of fluid to the fuel flow;

a temperature sensor for measuring a sensed temperature of the fuel flow entering the fuel pump; and a valve responsive to the sensed temperature of the fuel flow, the valve being configured to route the fuel flow from the fuel pump to the heat exchanger when the sensed temperature drops below a threshold temperature level.

14. The gas turbine engine fuel system of claim 13 wherein the heat exchanger is configured to route the fuel flow back to the fuel pump for delivery to the combustor.

15. The gas turbine engine fuel system of claim 13 wherein the motive flow of fluid comprises air generated by a fan.

16. The gas turbine engine fuel system of claim 15 and further comprising:

an oil cooler configured to receive air from the fan and oil from a lubrication system connected to the gas turbine engine.

17. The gas turbine engine fuel system of claim 15 wherein the motive flow of fluid from the heat exchanger is discharged from the gas turbine engine fuel system.

* * * * *